Patented May 17, 1949

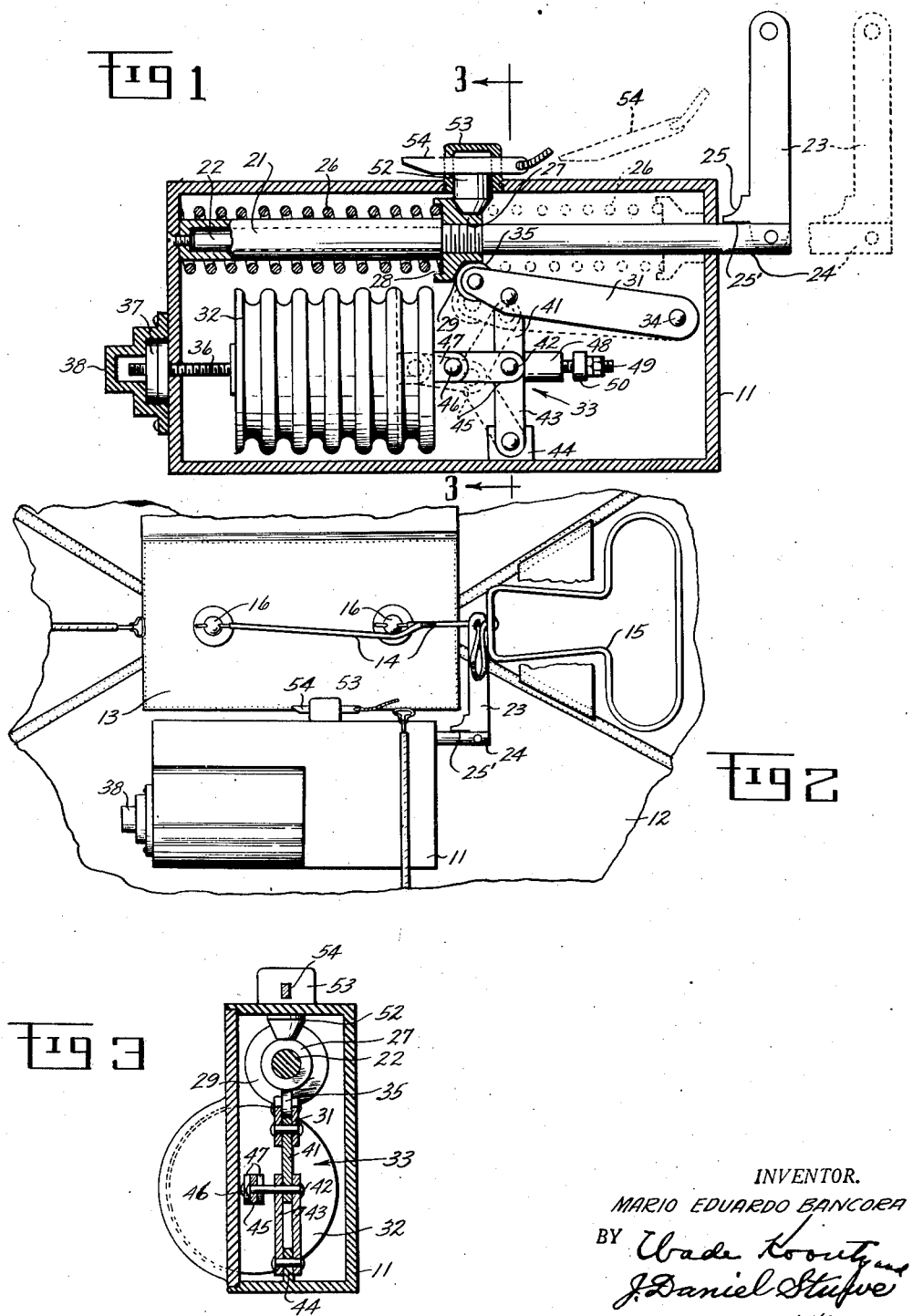

2,470,457

UNITED STATES PATENT OFFICE 2,470,457

PARACHUTE RELEASE MECHANISM

Mario Eduardo Báncora, Rosario, Argentina, assignor to the United States of America as represented by the Secretary of War Application June 10, 1946, Serial No. 675,643

6 Claims. (Cl. 244—150)

This invention relates to a mechanism for automatically releasing a parachute at a predetermined altitude and atmospheric pressure.

An essential object of this invention is to provide an improved mechanism for the parachute of a person leaving an airplane at a high altitude which mechanism will automatically and quickly pull the rip cord and release the parachute at a predetermined altitude and atmospheric pressure, independently of variations in the ambient temperature.

A more particular object of this invention is to provide such an automatic parachute release mechanism wherein a pressure responsive device will actuate an over-center linkage for speedily releasing a spring pressed plunger so as to pull the rip cord when the parachute and mechanism descend into a predetermined altitude and pressure.

These and various other objects and advantages are obtained with this invention, as will become apparent from the following description, taken in connection with the accompanying drawings wherein the invention is shown in its preferred form, it being evident that other arrangements and forms of construction may be resorted to in carrying out the objects and purposes of this invention.

In the drawings:

Fig. 1 is a longitudinal, sectional, view taken through this improved parachute release mechanism.

Fig. 2 shows the release mechanism in its operative or set position mounted on the parachute.

Fig. 3 is a cross-sectional view taken on line 3—3 of Fig. 1.

My improved release mechanism, as described in this case, comprises a supporting frame 11 which is preferably in the form of a housing that supports and incloses the operating elements, and this frame or housing is adapted to be mounted on the parachute pack 12, adjacent to the closing flap 13, and in association with the rip cord 14 and the rip cord handle 15, as indicated in Fig. 1 of the drawing, in a suitable position for pulling the rip cord out of the lock studs 16 to release the parachute from the pack.

In this improved mechanism a sleeve 21 is secured in the housing and a bar or rod 22 is slidably mounted in said sleeve and extends partly through an aperture in the housing. An arm 23 is pivoted to the extending part 24 of said rod and has an elbow 25 at its pivoted end including an edge part 25' arranged to abut the rod and limit the movement of said arm 23 toward the housing, beyond its illustrated right-angle position. However, the elbow 25 permits the arm 23 to swing on its pivot outwardly away from the housing, when the rip cord handle 15 is pulled manually, so as to draw the rip cord to which said arm 23 is connected.

A main spring 26, which is a compression spring, is mounted concentrically around said sleeve 21 and rod 22, and a collar 27 is rigidly secured to the rod 22, the collar having an annular recess or seat 28 on one end, and said spring 26 being normally confined in its compressed position between the recess 28 of said collar and the inside of the housing wall. The collar has a beveled surface 29 on its other end which cooperates with a quick action or trigger device to quickly release or to fire this release mechanism at a predetermined altitude and pressure.

The trigger device, as illustrated herein, includes a trigger member or arm 31, being preferably composed of two spaced bars, as shown in Fig. 3, also a pressure responsive member which is preferably in the form of a bellows 32 that may be spring-loaded, and an interconnecting over-center linkage or trip means 33 interposed between said trigger arm 31 and said bellows 32, for releasing the arm from the spring seat upon a predetermined contraction of the bellows. Said arm 31 is pivoted at one end by a pin 34 in the housing and has a roller 35 at the other end engaging the beveled part 29 of collar 27. The bellows 32 is adjustably mounted by a rod 36 secured on one end of the bellows and being longitudinally adjustable in the housing by nuts 37 which are mounted in a cap 38 secured on the housing. The trip linkage 33, as illustrated, includes a link 41 pivoted to arm 31 and also pivoted by a pin 42 to a pair of links 43 which are pivoted to a bracket lug 44 in the housing, said pin 42 having also pivoted thereto a link 45 which is pivoted by a pin 46 to bracket lugs 47 secured to the end of bellows 32.

When a person or article carrying a parachute equipped with this release mechanism leaves an airplane at a high altitude where the atmospheric pressure is less than the predetermined value, and where this device is then normally at rest with the bellows expanded, the trip linkage is held against a stop member 48 which is retained adjustably in place by a screw 49 threaded in a bracket arm 50 fixed in the housing. The trip linkage 33 is then held straight and the arm 31 is held in its locking position against the beveled surface 29 of collar 27 so as to retain spring 26 in its compressed position. As the person with the parachute and attached mechanism thereafter descends to a denser atmosphere where the ambient pressure falls below the predetermined value, the bellows contract and the trip linkage moves away from stop 48, until the over-center trip linkage moves past dead center, and the component of the spring pressure which acts radially of collar 27, serving to press roller 35 outwards on the beveled edge 29 of the collar, will cooperate with the release action of the bellows in suddenly triggering or snapping the arm 31 with its roller 35 clear from the collar 27, whereupon the rod 22, under pressure of spring 26, is plunged outward quickly and its arm 23 pulls the rip cord of the parachute for releasing the latter.

In order to prevent the mechanism from firing when not in use, a safety catch 52, movable in a cap 53 on the housing, is pressed inward through an aperture in the wall of the housing into engagement with the beveled part of collar 27 and is held there by means of a manually operable safety pin 54, as shown in Fig. 1.

In setting or preparing the mechanism for use, the ambient pressure, that is the altitude of firing, is preset or predetermined by adjusting the adjustment nut 37 for correctly positioning the bellows 32 in the housing. The mechanism is then set at ground level by manually forcing the rod 22 inward into its sleeve against the pressure of spring 26, and the rod is then locked in position by means of safety catch 52 held by pin 54, as shown in full line position in Fig. 1. This mechanism is then secured in such a set position on the parachute pack with which it is to be used. At such ground level the bellows 32 is contracted and the trip linkage 33 and the trigger arm 31 are also in their retracted or released position. When the parachute with this mechanism is then taken up to a high altitude, where the atmospheric pressure is below the predetermined pressure, the trip linkage 33 and the trigger arm 31 are automatically forced into holding position by the expansion of the bellows 32, into the position shown in the drawing. Immediately before jumping from the airplane, the safety pin 54 is withdrawn, as indicated by the dotted line position in Fig. 1, thereby unlocking the safety catch 52. However, because of the reduced pressure of the ambient atmosphere the trigger arm 31 remains in locked position in engagement with the beveled part of collar 27, thereby preventing operation of the mechanism for opening the parachute until the jumper falls to an altitude at which the atmospheric pressure equals the predetermined pressure and altitude. At this altitude the trigger device is automatically fired and the rip cord is pulled automatically, so as to open the parachute.

It should be noted that this automatic release device will not interfere with the manual operation of the rip cord 14 by its handle 15, because of the pivotal arrangement of arm 23 on rod 22. Thus, when jumping from a point below said predetermined altitude and pressure the safety pin 54 will not be withdrawn from safety catch 52, and the jumper simply pulls the rip cord 14 by means of the handle 15 in the usual manner, therewith merely swinging the arm 23 on its pivot, away from the housing, along in its movement with the rip cord handle and rip cord.

I claim:

1. An automatic parachute release mechanism arranged for mounting on a parachute pack in association with the rip cord and the means for manually pulling said cord, said mechanism comprising a plunger and means for connecting it with the rip cord, said connecting means being movable on the inactive plunger when the rip cord is pulled manually, means for actuating said plunger to withdraw the rip cord automatically, and a snap action device to normally hold said plunger actuating means restrained above a certain altitude, said device including pressure responsive means to actuate it and suddenly release said plunger actuating means from restraint so as to operate the plunger for pulling the rip cord when the mechanism descends below said certain altitude.

2. An automatic parachute release mechanism comprising a support to be mounted on a parachute pack and carrying a spring normally under restraint, a plunger operable by the spring and including means connectable with the rip cord of the parachute pack, safety means to secure the plunger and spring inactive and being released before starting a descent, means to hold the plunger and thereby retain the spring in its restrained position, pressure responsive means, and an over-center trip linkage normally retaining the holding means in its set position and being sprung into release position by the pressure responsive means to free the holding means and spring and therethrough actuate the plunger and rip cord when the mechanism descends from a higher altitude to a predetermined altitude and atmospheric pressure.

3. An automatic parachute release mechanism comprising a supporting housing to be mounted on a parachute pack and containing a plunger having an arm movably mounted thereon and arranged for connection with the rip cord of the parachute pack, said arm being movable on said plunger by action of the connected rip cord when the rip cord is pulled manually, a spring for actuating the plunger automatically, safety means for securing the plunger inactive and being manually releasable before starting on a descent, a member to normally hold the plunger with the spring retracted, a bellows, and an over-center trip linkage normally retaining said member in its holding position and being sprung into release position by action of said bellows to free the member and thereby extend the spring and the plunger and pull the rip cord when the mechanism descends from a higher altitude to a predetermined altitude and atmospheric pressure.

4. An automatic parachute release mechanism comprising a housing to be mounted on a parachute pack, a bellows mounted adjustably in the housing, a spring in the housing being normally under compression, a plunger in the housing carrying a seat for the spring and extending in part beyond the housing, an arm pivoted to said extending part and being arranged for connection to the rip cord of the parachute pack for automatically pulling the same, said arm being swingable on the pivot when the rip cord is pulled manually, a trigger member mounted in the housing to engage said seat and retain the plunger in position, and a trip linkage operably connected to said bellows and to said trigger member, thereby normally retaining said member in its holding position to be sprung by operation of the bellows on descent from a higher altitude to a predetermined altitude and atmospheric pressure so as to release the member from the seat and let the spring automatically actuate the plunger and rip cord.

5. An automatic parachute release mechanism comprising a housing to be mounted on a parachute pack, an evacuated bellows mounted in the housing, a spring in the housing, a member in the housing carrying a seat for the spring and also carrying a part connectable to the rip cord of the parachute pack, a trigger arm mounted in the housing to be braced against a beveled part of said seat and retain the member with the spring in the retracted position, safety means for securing said member inactive and being manually releasable before starting a descent, and a trip linkage operably connected to said bellows and to said trigger arm to normally retain the arm in the holding position to be sprung by collapsing of said bellows upon descending into a predetermined altitude and atmospheric pressure, whereby said trip linkage will promptly move said arm away from said beveled part of the seat, under the aid of pressure of the releasing spring, for extending the spring and arm to pull the rip cord.

6. An automatic parachute release mechanism comprising a housing to be mounted on the parachute pack, a bellows adjustably mounted in the housing, a spring in the housing, a plunger in the housing carrying a seat for the spring and also a pivoted part on the plunger connectable to the rip cord of the parachute pack, said pivoted part being swingable on its pivot by action of the connected rip cord when the rip cord is pulled manually, a trigger arm mounted in the housing and including rounded means to engage a beveled part of the seat and retain the plunger with the spring in the retracted position, safety means whereby to secure said plunger inactive and being manually releasable before a descent, and a trip linkage operably connected to said bellows and to said trigger arm to normally retain the arm in the holding position and to be sprung by action of the bellows upon descending from a higher altitude into a predetermined altitude and atmospheric pressure, whereupon said trip linkage will slide said rounded means speedily away from the beveled part of the seat, under the aid of pressure of said spring, for extending the spring and arm to pull the rip cord.

MARIO EDUARDO BÁNCORA.

REFERENCES CITED

The following references are of record in the file of this patent:

UNITED STATES PATENTS

| Number | Name | Date |
| --- | --- | --- |
| 1,227,230 | Aikman | May 22, 1917 |
| 1,802,486 | Summers | Apr. 28, 1931 |
| 2,353,440 | Bresee | July 11, 1944 |

FOREIGN PATENTS

| Number | Country | Date |
| --- | --- | --- |
| 585,265 | Great Britain | Feb. 3, 1947 |
| 814,497 | France | Mar. 22, 1937 |